US008623226B2

(12) United States Patent  (10) Patent No.: US 8,623,226 B2
Rimai et al.  (45) Date of Patent: Jan. 7, 2014

(54) MAKING STACKED PANCAKE MOTORS USING PATTERNED ADHESIVES

(75) Inventors: Donald S. Rimai, Webster, NY (US); Roland R. Schindler, II, Pittsford, NY (US); Christopher J. White, Avon, NY (US)

(73) Assignee: Eastman Kodak Company, Rochester, NY (US)

( * ) Notice: Subject to any disclaimer, the term of this patent is extended or adjusted under 35 U.S.C. 154(b) by 66 days.

(21) Appl. No.: 13/445,114

(22) Filed: Apr. 12, 2012

(65) Prior Publication Data
US 2013/0270219 A1  Oct. 17, 2013

(51) Int. Cl.
*C03C 15/00*  (2006.01)
(52) U.S. Cl.
USPC ............... 216/33; 216/13; 216/20; 216/43; 438/628; 438/736
(58) Field of Classification Search
USPC ........... 216/13, 18, 20, 33, 35, 40, 43, 49, 77, 216/78; 438/619, 622, 624, 628, 736, 742
See application file for complete search history.

(56) References Cited

U.S. PATENT DOCUMENTS

| | | | |
|---|---|---|---|
| 4,413,895 A | 11/1983 | Lee | |
| 6,005,324 A | 12/1999 | Kim | |
| 6,144,571 A * | 11/2000 | Sasaki et al. | 363/144 |
| 6,608,641 B1 | 8/2003 | Alexandrovich et al. | |
| 6,724,580 B2 * | 4/2004 | Irie et al. | 360/294.4 |
| 7,112,910 B2 | 9/2006 | Lopatinsky et al. | |
| 7,573,173 B1 | 8/2009 | Frownfelter | |
| 7,608,964 B2 | 10/2009 | Yamagiwa | |
| 8,076,808 B2 | 12/2011 | Kim et al. | |
| 2001/0046107 A1 * | 11/2001 | Irie et al. | 360/294.4 |
| 2002/0105237 A1 | 8/2002 | Itoh et al. | |
| 2003/0049889 A1 | 3/2003 | Yamaguchi et al. | |
| 2006/0133870 A1 | 6/2006 | Ng et al. | |
| 2008/0143362 A1 * | 6/2008 | Narita et al. | 324/754 |

FOREIGN PATENT DOCUMENTS

| | | |
|---|---|---|
| EP | 0 548 362 A1 | 6/1993 |
| GB | 2 327 304 | 1/1999 |
| WO | 2009/038648 A1 | 3/2009 |

* cited by examiner

*Primary Examiner* — Lan Vinh
(74) *Attorney, Agent, or Firm* — Nelson Adrian Blish (57) ABSTRACT

A method of making a shaped electrical conductor (610, 630) includes providing a first sheet of metal (319) and applying a first and second thermoplastic adhesive pattern (311, 312) to a first and a second surface thereof. The second pattern is are fully justified with the applied first pattern. The first sheet is etched to remove metal not covered by the patterns so that no metal bridges remain between disconnected coated portions. A second sheet of metal (339) is provided and a third and fourth thermoplastic adhesive pattern (333, 334) is applied to a first and second surface thereof. The third and fourth patterns are fully justified. The second sheet is etched as for the first sheet. Contact regions (315, 335) in the second and third patterns are joined to form electrical contact between the first and second sheets.

18 Claims, 6 Drawing Sheets

MAKING STACKED PANCAKE MOTORS USING PATTERNED ADHESIVES

CROSS REFERENCE TO RELATED APPLICATIONS

Reference is made to commonly-assigned copending U.S. patent application Ser. No. 13/445,125, filed Apr. 12, 2012, entitled SHAPED ELECTRICAL CONDUCTOR, by Schindler et al.; the disclosure of which is incorporated herein.

FIELD OF THE INVENTION

This invention relates to electric motors in general and in particular to electric motors having a flat armature wherein the armature comprises a conductive pattern formed on an insulating substrate.

BACKGROUND OF THE INVENTION

Electric motors are used in a wide variety of applications. In many of these applications, the weight of the motor is of critical importance. For example, in an electric car the overall weight of the vehicle is an important factor limiting the distance that the vehicle can be operated given a fixed battery capacity. However, given current designs, the electric motor itself can be among the heavier components in the vehicle. Thus while it is desirable to provide an electric motor have a high-power output for vehicle use, it is also desirable to have such a motor remain at a lower weight.

It will be appreciated that lighter weight electrical motors are otherwise desirable in many other applications as such motors and the manufactured goods in which such electric motors are incorporated are more easily transported, carried, manipulated, and used. Further, cost reductions and recycling advantages can be obtained where weight reductions are achieved by lighter weight electrical motors that require less material.

However, conventional wound motor designs do not readily lend themselves to weight reduction. One reason for this is that conventional wound coil motor designs require an armature or a stator having coiled conductors thereon. The coils are typically formed by winding wire on metallic laminates. The laminates provide shaped features about which the coils, typically made from a metal such as copper, can be wound.

These laminates add significant mass to the motor. This mass affects the operation of the system in which the motor is used by lowering the power-to-weight ratio of the system. In some cases, eddy currents can arise in the laminates, further reducing motor efficiency and lowering power-to-weight ratios.

In the case of an armature, the laminate mass can cause motor inefficiency in two additional ways. First, this laminate mass increases the inertia that must be overcome to start and stop rotation. Second, the laminate mass is at a distance from the axis of rotation of the armature. In an armature that has a shaft that has any eccentricity, or that has laminates that are not aligned with the shaft, this can create static and dynamic balance problems that consume energy. Additionally, shaft eccentricity and misaligned laminates affect the placement of the windings on the laminates, so the effects of any shaft eccentricity or laminate misalignment are further enhanced by the mass of the windings.

One effort to reduce the use of such laminates involves pancake or flat motors. Conventional flat motors are used in a variety of applications. For example, U.S. Pat. No. 8,076,808 describes a flat vibration motor, such as can be used in a cellular telephone. EP 0548362A1 describes construction of a typical prior-art flat motor, also known as a "pancake motor." The example described is a flat coreless DC motor having flat armature coils mounted on a disk. The coils are wound into sectors of the disk. The disk can be the rotor and can be mounted over a stator including a field magnet. When current is passed through the coils via a commutator, the rotor turns.

Various ways of manufacturing pancake motors, and specifically windings and rotors for pancake motors, have been described. WO 2009/038648 describes applying insulating material over a pre-formed electrical conductor and heating the assembly to activate an adhesive that bonds the insulating material to the conductor. However, this requires an insulator that includes the heat-activated adhesive, and requires that the conductors be formed to shape before being insulated.

U.S. Patent Publication No. 2002/0105237 describes a stator for a planar linear motor. The stator includes magnetic sheets (i.e., sheets of a material that can complete a magnetic circuit) set vertically and bound together, e.g., using a fluid hardening material or an epoxy resin.

However, such pancake motors use laminate structures that extend typically further from an axis of rotation than do conventional motors, creating increased balance problems, and adding weight. Further such motors have limited performance characteristics compared to conventional wound laminate motors.

What is needed in the art are motors that provide conventional performance characteristics while offering reduced motor mass. What is also needed in the art are new methods for motor manufacture.

SUMMARY OF THE INVENTION

Briefly, according to one aspect of the present invention a method of making a shaped electrical conductor includes providing a first sheet of metal having a first thickness and applying a first thermoplastic adhesive pattern to a first surface. A second thermoplastic adhesive pattern is applied to a second surface and is fully justified with the first pattern. The first sheet is etched to remove metal not covered by the thermoplastic adhesive patterns so that no metal bridges remain between disconnected coated portions of the first sheet. A second sheet of metal having a second thickness is provided and a third thermoplastic adhesive pattern is applied to a first surface of the second sheet. A fourth thermoplastic adhesive pattern is applied to a second surface of the second sheet and is fully justified with the third pattern. The second sheet is etched to remove metal not covered by the thermoplastic adhesive patterns so that no metal bridges remain between disconnected coated portions of the second sheet. A first contact region is selected in the second adhesive pattern and a second contact region in the third adhesive pattern and the second and third adhesive patterns are bonded to each other at more than one point. The first and second sheets are joined so that the first contact region is in electrical contact with the second contact region.

The invention and its objects and advantages will become more apparent in the detailed description of the preferred embodiment presented below.

The attached drawings are for purposes of illustration and are not necessarily to scale.

DETAILED DESCRIPTION OF THE INVENTION

Figure 2:
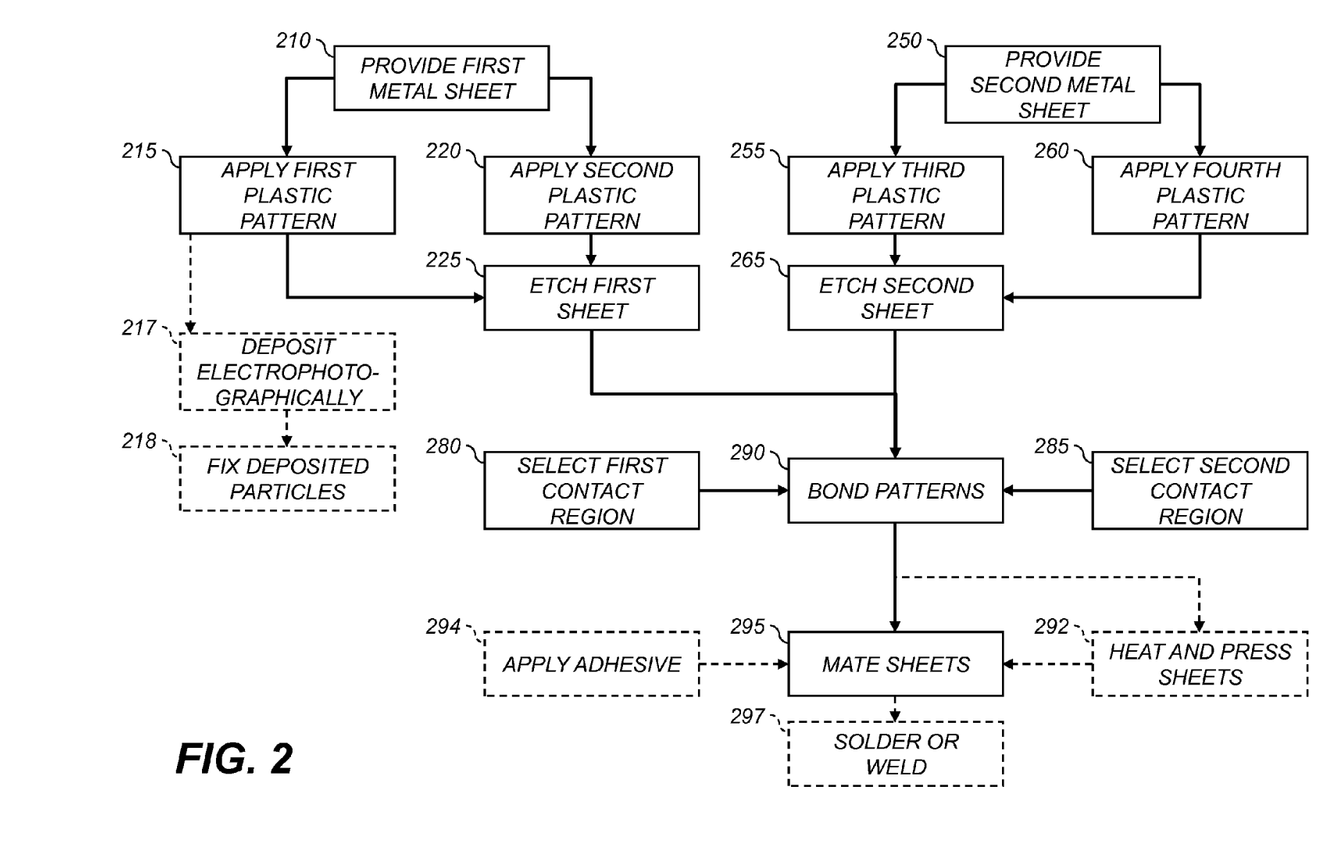
FIG. 2 shows various embodiments of methods of making a shaped electrical conductor.

FIG. 2 shows various embodiments of methods of making a shaped electrical conductor. Processing begins with step 210 or step 250. In step 210, a first sheet of metal having a first thickness is provided. The first sheet of metal, and other sheets of metal described herein, can be any electrically-conductive metal. For example, copper or aluminum can be used. Step 210 is followed by step 215 and step 220, which can be performed in any order.

In step 215, a first thermoplastic adhesive pattern is applied to a first surface of the first sheet. The term "adhesive," as used herein, does not require a pressure-sensitive adhesive, or one that is tacky under normal environmental conditions. An adhesive has the capability of adhering during bonding, described below with reference to step 290, but is not necessarily a glue, tape, cement, or epoxy (although it can be any of those in various embodiments). In various embodiments, step 215 includes steps 217 and 225. Step 215 is followed by step 225.

In step 217, an electrophotographic print engine is used to deposit thermoplastic particles in a corresponding deposition pattern. Electrophotography can also be used for steps 220, 255, and 260. More detail of electrophotographic deposition is given in FIG. 1, discussed below. The first plastic pattern can also be applied by flood-coating or spin-coating over a mask that defines the deposition pattern. Step 217 is followed by step 218.

In step 218, the deposited particles are fixed to the corresponding sheet under heat or pressure. This is also described below with reference to FIG. 1, and can also be used in steps 220, 255, and 260.

In step 220, a second thermoplastic adhesive pattern is applied to a second surface of the first sheet. The second pattern is fully justified with the applied first pattern. "Fully justified" means that, within tolerances, the first and second thermoplastic adhesive patterns overlap completely as viewed along a normal to the first sheet. In various embodiments, the first and second thermoplastic patterns are mirror-images of each other. As a result, within tolerances, at any point on the first sheet, a ray passing through the point along the normal to the sheet at that point either passes through both the first and second thermoplastic patterns, or through neither pattern. Step 220 is followed by step 225.

In step 225, the first sheet is etched to remove metal not covered by the thermoplastic adhesive patterns so that no metal bridges remain between disconnected coated portions of the first sheet. Since the metal is covered on both sides by the fully justified first and second thermoplastic patterns, the sheet will be etched through where the patterns are absent, and protected where the patterns are present. Some undercutting due to over-etching can occur at the edges of protected areas. Step 225 is followed by step 290.

In step 250, a second sheet of metal having a second thickness is provided. This is as described above with reference to step 210. Step 250 is followed by step 255 and step 260.

In step 255, a third thermoplastic adhesive pattern is applied to a first surface of the second sheet. This is as described above with reference to step 215. The third thermoplastic adhesive pattern can be the same as, or different from, either the first or second thermoplastic adhesive patterns. Step 255 is followed by step 265.

In step 260, a fourth thermoplastic adhesive pattern is applied to a second surface of the second sheet, the fourth pattern being fully justified with the applied third pattern (as above, step 220; same or different, as in step 255). Step 260 is followed by step 265.

In step 265, the second sheet is etched to remove metal not covered by the thermoplastic adhesive patterns so that no metal bridges remain between disconnected coated portions of the second sheet. This is as discussed above with reference to step 225. Step 265 is followed by step 290.

The result of steps up to 290 is a pair of metal sheets carrying patterned conductors. The first and second patterns can be the same as, or different from, the third and fourth patterns. The first and second metal sheets can be at least 0.1 mm thick. At least one of the thermoplastic adhesive patterns can include a plurality of traces (e.g., lines, curves, or segments thereof), each having a trace width less than 2 mm (e.g., 50 mil=1.25 mm). Spaces between traces can have space widths less than 2 mm (e.g., 50 mil=1.25 mm). Traces and spaces can also be 2 mm or wider.

Figure 3A:
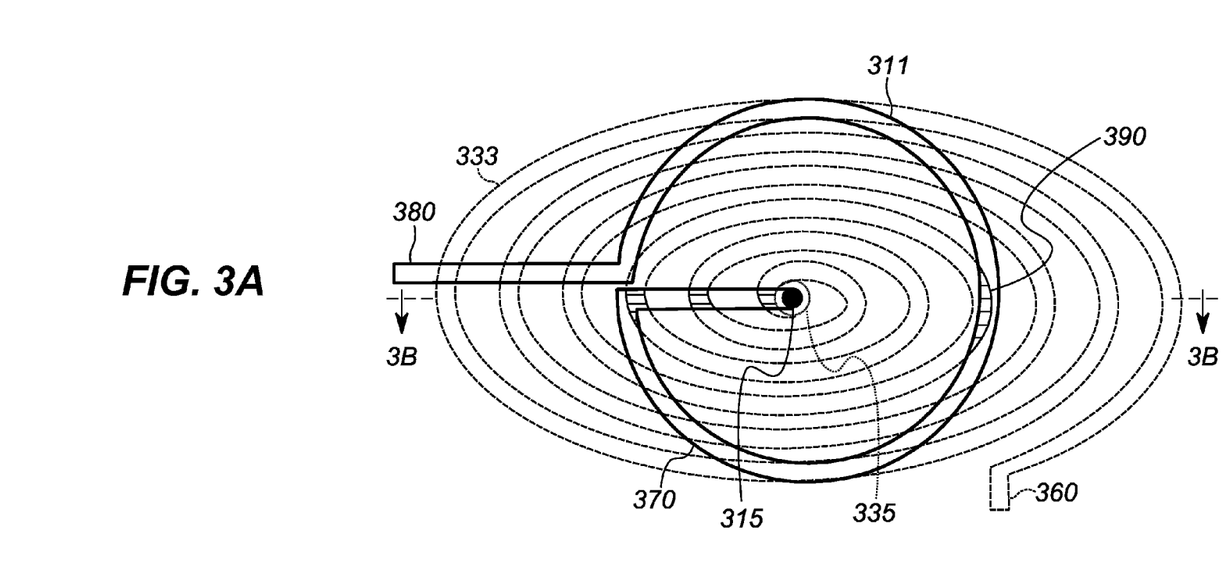
FIG. 3A is a top view of various examples of patterns.

In step 280, a first contact region in the second adhesive pattern is selected. In step 285, a second contact region in the third adhesive pattern is selected. Steps 280 and 285 can be performed in any order. The first and second contact regions are selected so that current will be able to flow through the conductors. An example is shown in FIG. 3. Steps 280 and 285 are followed by step 290.

In step 290, the second and third adhesive patterns are bonded to each other at more than one point. The sheets are brought together so that the second and third patterns can be bonded. No orientation of the sheets is implied by the designation of certain patterns as the second and third. Step 290 is followed by step 295 and optional step 292.

In step 295, the first and second sheets are mated so that the first contact region is in electrical contact with the second contact region. Step 295 can be performed as described with reference to optional steps 292 and 294. Step 295 is followed by optional step 297.

In optional step 292, the two sheets are heated and pressed together to bond them. This step can be used with toner-based thermoplastic patterns by heating the patterns above their glass transition temperatures $T_g$. The patterns are then pressed together to squeeze toner out from between the metal in the first and second contact regions, so that the metal areas in the two sheets come into electrical contact. The toner is then cooled below $T_g$ to fix the sheets together. This type of bonding is described below with respect to fuser 60 (FIG. 1) in the context of fusing toner to a receiver. In other embodiments, conductive toner can be used, or not all the toner squeezed out from between the sheets in the contact areas. In other embodiments, toner can be removed from the first and second contact regions by softening the toner (temperature $>T_g$) with a heat source, then removing the toner with a skive, vacuum, blow-off gun, abrasion wheel, or other mechanical device adapted to move or remove viscous toner. The heat source can be part of the device; for example, a heated skive can be used to simultaneously heat and move the toner. Step 292 is followed by step 295.

In optional step 294, the mating step includes applying a conductive adhesive to the first or second contact region and bringing the two contact regions into mechanical contact with the applied adhesive. For example, dimethyl, methylhydrogen siloxane, e.g., DOW CORNING 7920, can be used. Silver-containing siloxane, e.g., DOW CORNING® DA 6524, can also be used. Adhesives can include >80 wt % silver, or 90 wt % silver. Step 294 is followed by step 295.

In optional step 297, the mating step includes soldering or welding the first contact region and the second contact region together.

In various embodiments, steps corresponding to steps 210, 215, 220, 225 are performed to apply fifth and sixth fully-registered thermoplastic patterns on a third metal sheet having a third thickness. The third sheet is then etched. This is as described above. Contact areas are selected in the fourth and fifth thermoplastic layers, and the second and third sheets are bonded and mated as described above (steps 290, 295). This forms a three-metal-sheet structure. The thicknesses of the metal sheets can be the same as or different from each other.

In various embodiments, a third sheet of metal having a third thickness is provided. A fifth thermoplastic adhesive pattern is applied to a first surface of the third sheet, and a sixth thermoplastic adhesive pattern fully justified with the applied fifth pattern is applied to a second surface of the third sheet. The third sheet is etched to remove metal not covered by the thermoplastic adhesive patterns so that no metal bridges remain between disconnected coated portions of the third sheet. This is as described above for the first and second sheets.

A third contact region is then selected in the fourth adhesive pattern, e.g., as described above for the first contact region. A fourth contact region is selected in the fifth adhesive pattern, e.g., as described above for the second contact region. The fourth and fifth adhesive patterns are bonded to each other at more than one point, resulting in a structure with three metal layers: the first and second metal layers bonded to each other, and the second and third metal layers bonded to each other. The second and third sheets are then mated, as described above, so that the third contact region is in electrical contact with the fourth contact region.

FIG. 3A is a top view of various examples of patterns. First pattern 311 (and also the second, hidden in the top view since the patterns are in register) is shown solid; third pattern 333 (and the fourth pattern) is shown dashed. The edges of the patterns are shown; for example, the dashed shape of third pattern 333 encloses the area in the pattern where thermoplastic and metal are intended to be. In the example shown here, the first and second patterns are circular and the third and fourth patterns are elliptical spirals. The long axis of the elliptical spirals (e.g., third pattern 333) is twice a length of an axis of the first and second circular patterns (first pattern 311).

First contact region 315 in second adhesive pattern (hidden under first adhesive pattern 311) is a small disk. Second contact region 335 in third pattern 333 is a slightly larger disk. The two contact regions 315, 335 overlay, forming electrical contact between the metal protected from etching in regions 315, 335. As a result, current into electrode 360 defined by third pattern 333 travels the spiral conductor defined by third pattern 333, the conductor defined by second contact region 335, the conductor defined by first contact region 315, electrode 370 defined by first pattern 311, the circle defined by first pattern 311, and out electrode 380 defined by first pattern 311.

Corners in the patterns can be chamfered or not. The width of the pattern can vary or not at various points on the pattern; the example shown does not vary the width of the pattern at corners.

Figure 3B:
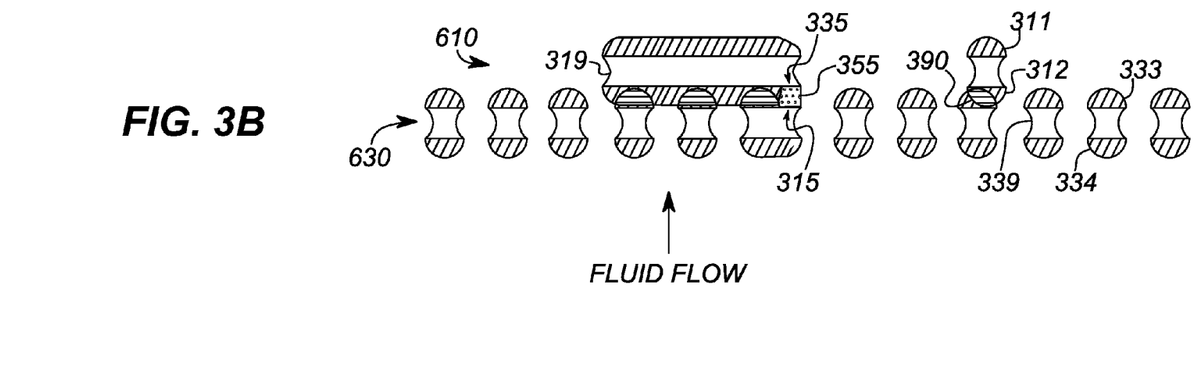
FIG. 3B is a cross-section along the line 3B-3B in FIG. 3A.

FIG. 3B is a cross-section along the line 3B-3B in FIG. 3A. First conductor 610 is defined by first pattern 311 and second pattern 312. In this section, two segments of conductor 610 are visible. Second conductor 630 is defined by third pattern 333 and fourth pattern 334. Conductor 630 is shown below conductor 610, but can be above it. In this section, twelve segments of conductor 630 are visible. First conductor 610 and second conductor 630 are, respectively, the etched first and second metal sheets 319, 339. First contact region 315 and second contact region 335 are shown electrically connected by conductive adhesive 355 to carry current between them. In the embodiment shown, toner has been removed from first contact region 315 and second contact region 335 prior to applying conductive adhesive 355, as discussed above.

First pattern 311 is formed in first metal sheet 319. For clarity, metal sheet 319 is labeled on only one of the visible conductor segments. However, as shown in FIG. 3A, all of the visible conductor segments corresponding to first pattern 311 are part of metal sheet 319. Likewise, second pattern 312 is formed on second metal sheet 339. The sides of the segments of first metal sheet 319 and second metal sheet 339 are shown undercut to represent graphically the possibility of over-etching of the metal sheet. No particular cross-sectional shape of the conductor segments is required.

First metal sheet 319 has first thermoplastic pattern 311 on its top surface and second thermoplastic pattern 312 on its bottom surface. Second metal sheet 339 has third thermoplastic pattern 333 on its top surface and fourth thermoplastic pattern 334 on its bottom surface. For clarity, only one segment is labeled, even though the thermoplastic patterns are continuous within a layer, as shown in FIG. 3A. As shown, second thermoplastic pattern 312 and third thermoplastic pattern 333 have been pressed together to bond first metal sheet 319 to second metal sheet 339.

In various embodiments of the use of this structure as a motor winding, fluid is passed through the winding as indicated by the "FLUID FLOW" arrow. The fluid can be ethylene glycol, deionized water, air, nitrogen, or another fluid adapted to remove Joule heat from the conductors in metal sheets 319, 339. Fluid can be pumped or otherwise moved actively, or permitted to flow passively by convection.

Referring to FIGS. 3A and 3B, bonding area 390 (shown hatched with horizontal lines) is an area in which the second and third patterns overlap. Consequently, when first metal sheet 319 and second metal sheet 339 are bonded together, the thermoplastic adhesive of second pattern 312 and of third pattern 333 in bonding area 390 adhere to each other. This adhesion of metal sheets 319, 339 to each other provides mechanical strength to the resulting assembly. In various embodiments, a plurality of the regions of overlap between second pattern 312 and third pattern 333, or all of the overlap regions, are bonding regions. FIGS. 3A and 3B show several bonding regions hatched with horizontal lines. Other bonding regions besides those shown hatched can be used.

In various embodiments described above in which three sheets of metal are used, the fifth thermoplastic pattern (not shown) is a rotation of first thermoplastic pattern 311. That is, respective rotation centers of the first and fifth thermoplastic patterns are aligned and the fifth thermoplastic pattern is rotated about its rotation center with respect to first thermoplastic pattern 311. Other than the rotation, the fifth thermoplastic pattern is identical to first thermoplastic pattern 311

(within manufacturing tolerances). Since the fifth and sixth thermoplastic patterns are fully justified, the sixth thermoplastic pattern is also a rotation of second thermoplastic pattern 312.

As is shown here, the motor so formed does not have a laminate portion and therefore can have reduced mass and density as compared to the prior art. Moreover, in embodiments in which no laminate or other core is used, there are no losses due to in-core eddy currents.

Figure 4:
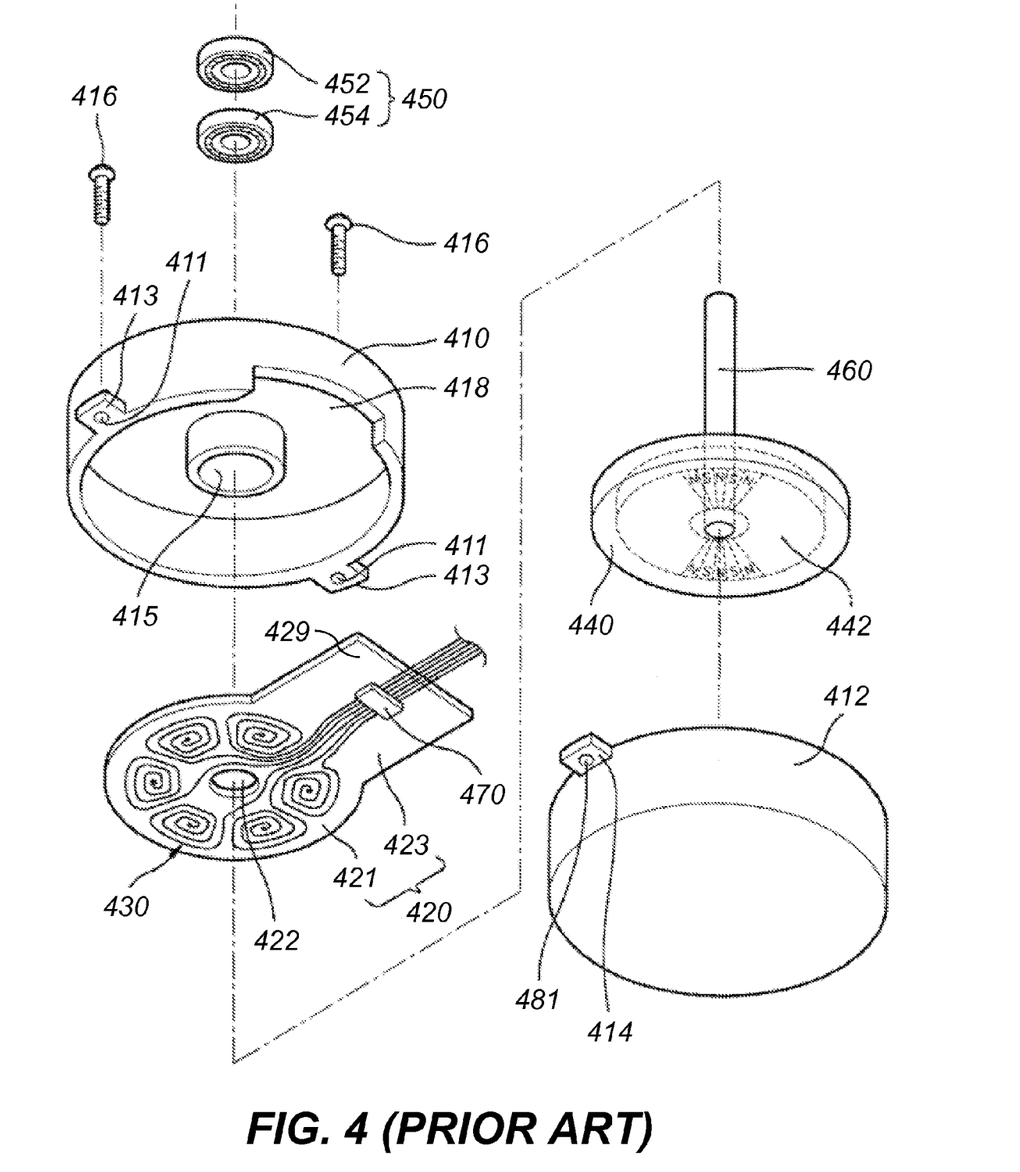
FIG. 4 is a partial perspective view showing a pancake motor according to the prior art.

FIG. 4 is a partial perspective view showing a pancake motor according to the prior art. The pancake motor is brushless motor having housing with upper housing 410 and lower housing 412. Printed circuit board (PCB) 420 is installed in upper housing 410. Stator 430 is disposed over underside 429 of PCB 420. Stator 430 includes a plurality of coil layers piled up on top of each other, e.g., by photolithography. Rotor 440 is spaced apart from the lower surface of stator 430 and includes permanent magnets 442 disposed at an inner peripheral surface of rotor 440. The permanent magnets have opposite orientations as they are around the rotor, as shown (alternating N and S poles facing down). Rotating shaft 460 is rotatably connected to upper housing 410 by a bearing in opening 415, and an electric signal control unit 470 installed at an end portion of the PCB 420 and periodically supplying electric current to stator 430.

PCB 420 includes an annular base 421 and an elongated plate 423 integrally formed at an end portion of annular base 421. Elongated plate 423 extends out of upper housing 410 through opening 418 formed at a side wall of upper housing 410.

Stator 430 can be formed over underside 429 of PCB 420 by photolithography. In various embodiments, a conductive material such as copper is applied on underside 429 of PCB 420 to form a copper layer. A photo-active solution is deposited over the copper, and a photo mask on which the coil shape is printed is placed on the solution.

When the photo mask is irradiated, a coil shape that is similar to the photo mask is patterned on the surface of the solution on the copper layer. After exposure, an etching solution is applied to PCB 420. The etching solution reacts with the photoactive layer and copper layer so that a first coil layer is formed, i.e., by removing undesired copper. After forming the first coil layer, a first insulation layer is formed on the underside of the first coil layer. Multiple conductive layers can be formed in this way, and vias can be drilled and plated between them to connect them.

Rotor 440 is spaced apart from the underside of stator 430 by the predetermined distance. Rotor 440 has a cylindrical shape, and has permanent magnets 442 which are radially disposed on an upper surface of rotor 440 in such a manner that adjacent permanent magnets 442 have different poles from each other to generate a magnetic field which makes electromagnetic-interaction with the electric field of stator 430 to rotate rotor 440, rotating shaft 460 is integrally formed at a center of rotor 440, so as to rotate when rotor 440 rotates.

Upper housing 410 is formed at an upper portion thereof with a circular opening 415, and an upper and lower bearings 452 and 454 are mounted at an inner portion of upper housing 410. Accordingly, rotating shaft 460 is rotatably attached to upper housing 410 by upper and lower bearings 452 and 454.

Upper housing 410 includes bracket 413 formed on the bottom edge thereof, including hole 411. Lower housing 412 includes bracket 414 formed on the top edge thereof, including hole 481. A fixing member 416 such as a bolt penetrates holes 411 and 481 so that upper and lower housings 410 and 412 are integrally assembled. Other assembly techniques can also be used. Multiple brackets per housing can also be used, as shown here.

Further details of pancake motors are given in U.S. Pat. Nos. 6,005,324; 7,112,910; 7,608,964; and 7,573,173, the disclosures of which are incorporated herein by reference.

Figure 5:
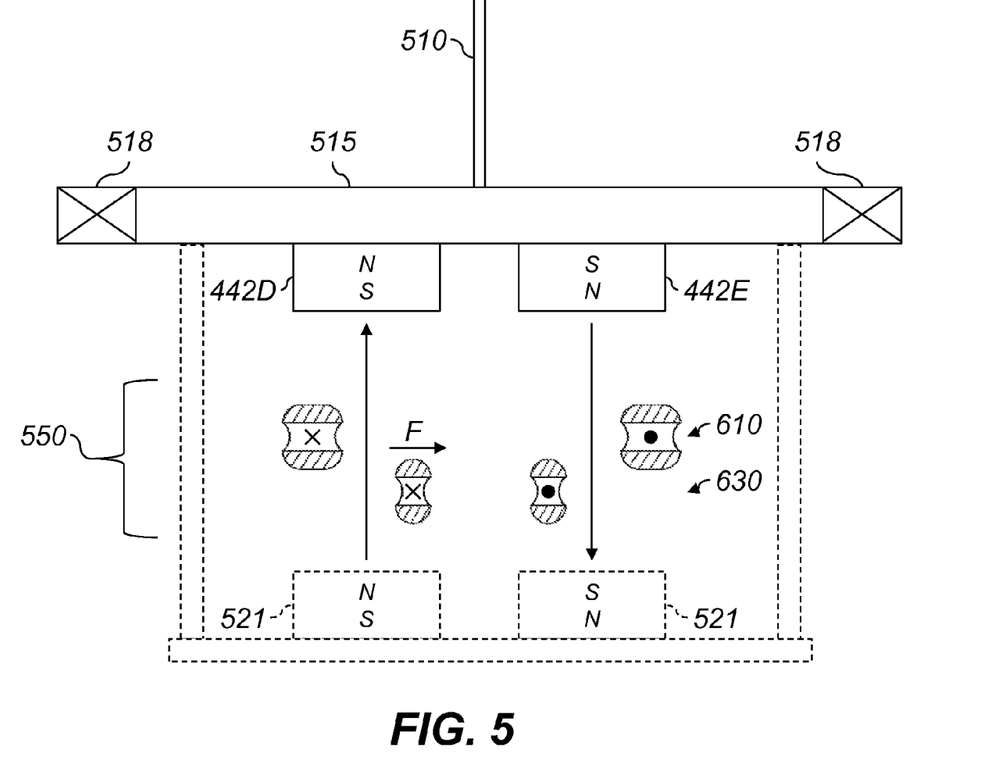
FIG. 5 is a cross-section of a pancake motor according to various embodiments.

FIG. 5 is a cross-section of a pancake motor according to various embodiments. This section is taken along the line 5-5 in FIG. 6.

There are two commonly-used types of configurations of pancake motor windings. In a first configuration type, wires are arranged to extend substantially radially on rotor 515, and to be substantially straight where they pass magnets 442D, 442E. The Lorentz force on the charge carriers in the conductors is tangential, in accordance with Fleming's left-hand rule for motors. In some of these configurations, individual wires extend radially out rotor 515, past one magnet (e.g., magnet 442D), then radially back in past a different magnet (e.g., magnet 442E). In other configurations, squared-off spiral windings in the plane of rotor 515 are used, and the tangential portions of those spirals are arranged beyond magnets 442D, 442E so they do not contribute significant radial Lorentz forces. The sections of the spirals that pass the magnets contribute tangential forces.

In a second type of configurations, the wires are formed into tight, approximately circular spirals. These coils act as solenoids and produce distinct north and south magnetic poles when current is passed through them. These poles attract and repel the poles of magnets 442D, 442E, providing tangential forces.

In this example, rotor 515 is mounted on bearings 518. Shaft 510 is connected to the center of rotor 515 to transmit rotary motion. Magnets 442D, 442E, which can be permanent magnets or electromagnets, are attached on one face of rotor 515. Any number of magnets can be used, arranged in a circle around the face of rotor 515, as shown by magnets 442 (FIG. 4). Rotor 515 can also include optional bracket supporting optional magnets 521. Arrows indicate the direction of the magnetic field between magnets 442D, 442E, and 521. Other configurations can be used, such as magnets only over or only under the stator, magnets around the stator, or combinations of these. The shaft can pass through an opening in the stator, and can be attached to the top or bottom of the rotor.

Stator 550 is arranged opposite magnets 442D, 442E, or between those and magnets 521. Stator 550 includes first conductor 610 defined by first and second thermoplastic patterns 311, 312 (FIG. 3B). Stator 550 also includes second conductor 630 defined by third and fourth thermoplastic patterns 333, 334 (FIG. 3B). In this section, two segments of each conductor 610, 630 are visible. The direction of current flow in each segment is shown by vector symbols. As shown, the direction of force on each conductor segment F is to the right according to the left-hand rule (pointer finger for magnetic field direction, middle finger for current direction; thumb for resultant force on the conductor). Since the stator is fixed, the equal and opposite force turns the rotor, as shown in FIG. 6.

Figure 6:
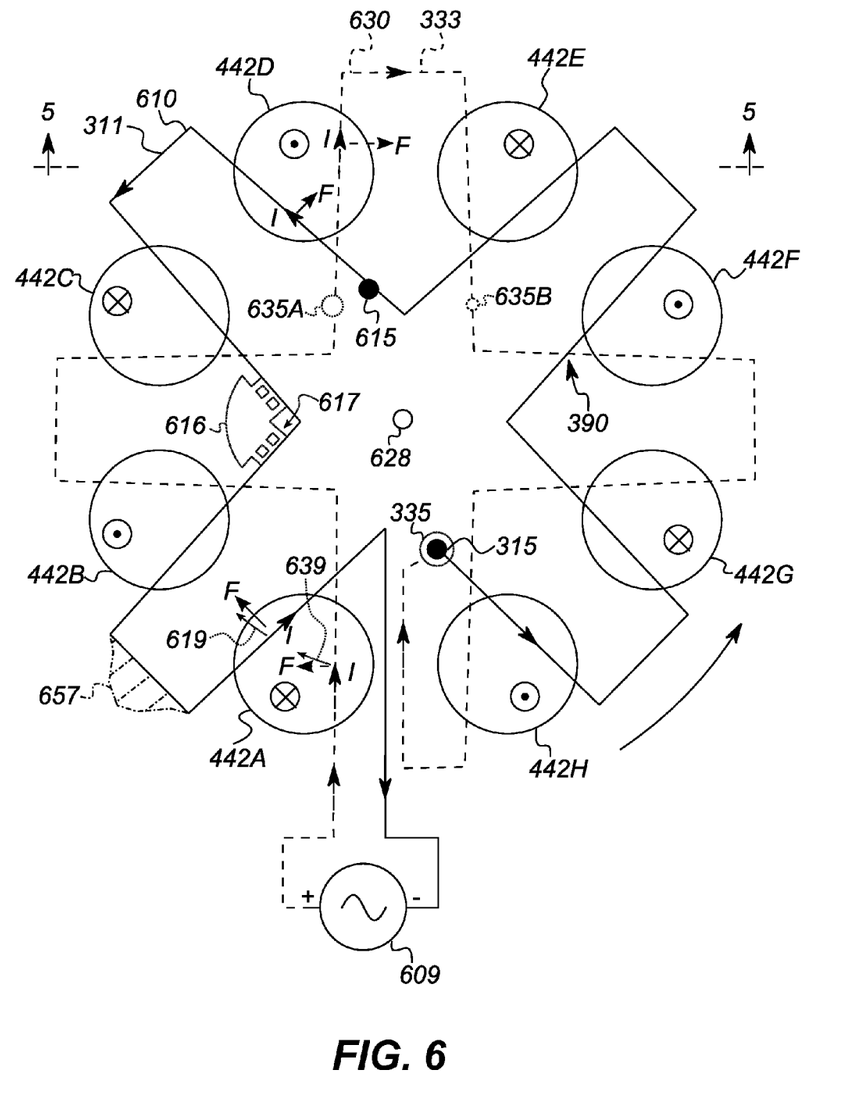
FIG. 6 is a top view of magnets and thermoplastic adhesive patterns according to various embodiments.

FIG. 6 is a top view of magnets and first and third thermoplastic adhesive patterns according to various embodiments, including embodiments useful in the motor shown in FIG. 5. As in FIG. 3A, the second and fourth thermoplastic patterns are not visible. For clarity, only the centerline of the conductors in each pattern is shown; the patterns are broader than the indicated centerlines. First pattern 311 is shown solid and third pattern 333 is shown dashed. First pattern 311 defines first conductor 610; third pattern 333 defines second conductor 630, which is formed from the second metal sheet. The configuration of conductors 610, 630 and AC supply 609 shown here is a stator; rotors can also be formed as described above with reference to FIG. 2. Where patterns 311, 333 overlap, e.g., at bonding area 390, conductors 610, 630 are bonded together for mechanical support. In various embodiments, a rotor for a brushless motor is formed. Rotors or stators can have two or any higher number of layers.

For clarity, conductors 610 and 630 are shown passing only once around the stator. Each conductor can have any number of nested turns with the same pattern, but progressively smaller. Conductors 610, 630 are arranged so that the force provides rotational motion, as described below.

Current is provided to the stator by AC supply 609. In FIG. 6, current flow is shown at a point in time at which the supply is providing current into second conductor 630. Conductors 610, 630 are electrically connected in respective contact areas 315, 335, as discussed above with reference to FIGS. 3A and 3B. Current flows from the positive terminal of AC supply 609 through second conductor 630, contact area 335, contact area 315, and conductor 610, then to the negative terminal of AC supply 609.

This stator can be used with an eight-pole rotor including magnets 442A, 442B, 442C, 442D, 442E, 442F, 442G, and 442H. The magnets can be over or under the stator, e.g., as shown in FIG. 5. Arrows on conductors 610, 630 represent the direction of current I in those conductors, and arrows orthogonal to conductors 610, 630 represent the direction of force F. The direction of the magnetic field from each magnet is shown by standard vector symbols (dots and crosses). Magnets 442A, 442C, 442E, and 442G have the magnetic field (N-S) into the plane of the drawing. Magnets 442B, 442D, 442F, and 442H have the magnetic field (N-S) out of the plane of the drawing.

Where conductor 630 passes magnet 442A (i.e., crosses over or under, or passes near or adjacent to, magnet 442A), the direction of current flow is in towards the center of the stator, as shown. The magnetic field is into the page. The resulting force on the stator is clockwise, as shown. Since the stator is fixed, the equal and opposite reaction will drive the rotor counter-clockwise. Conductor 610 is arranged so that the current through conductor 610 where it passes magnet 442A is also towards the center of the stator, so the force on the stator is also clockwise, as shown. Current is also inward, and force on the stator clockwise, where conductors 610, 630 pass magnets 442C, 442E, and 442G.

In this example, the forces from conductors 610, 630 where they pass magnet 442A are not entirely tangential. This is because conductors 610, 630 are not entirely radial where they pass magnet 442A. Conductors can be entirely radial or not, as long as the tangential components of the forces from the magnets sum to provide torque in a particular direction. Tangential arcs 619, 639 are shown for comparison between the directions of the force vectors and the tangential directions.

Where conductors 610, 630 pass magnet 442D (and also magnets 442B, 442F, and 442H), current flow is away from the center of the stator. Magnetic field is directed out of the page. Since the directions of current flow and magnetic field are both reversed from the situation over magnet 442A, the force on the stator is still clockwise, so the rotor is driven counterclockwise.

When the rotor rotates so that magnet 442B is passing the stator conductors that formerly passed magnet 442A, AC supply 609 reverses polarity. Current is provided into conductor 610 and out of conductor 630, so that the direction of force continues to be clockwise and the direction of rotation counterclockwise.

In embodiments in which conductors 610, 630 form a rotor, the conductors are driven clockwise. In these embodiments, brushes can be used to transmit current between AC supply 609 and conductors 610, 630. In normal operation, the polarity of AC supply 609 reverses once per magnet, so current over magnet 442A is directed inward in the position shown, and also inward after ⅛ revolution of the rotor together with a polarity change of AC supply 609. To change the direction of rotation of the motor, the polarity of AC supply 609 over each magnet is reversed. That is, in the position shown in FIG. 6, current over magnet 442A is directed outward rather than inward.

As shown, contact regions 315, 335 are not centered in the stator. They can be centered (e.g. as shown in FIG. 3A) or not. In embodiments in which conductors 610, 630 are used as a rotor, an axle can be attached at center of rotation 628. In various embodiments, particularly rotor embodiments, it is desirable to mechanically balance conductors 610, 630 to reduce lateral forces acting at center of rotation 628. Static or dynamic balance, or both, can be desirable.

In various embodiments, first pattern 311, third pattern 333, or both, along with corresponding second or fourth patterns, include balancing features that give the rotor uniform centrifugal force as it rotates past a selected observation point. Specifically, the first and second patterns, or the third and fourth patterns, define or include balancing features in the metal not removed from the corresponding metal sheet by the corresponding etching step. The balancing features can be located in areas of the patterns 311, 333 that do not pass any magnets (e.g., 442A).

In this example, balancing feature 615 is an area of conductor 610 of the same mass as contact area 315, disposed diametrically opposite contact area 315 with respect to center of rotation 628. Consequently, while conductors 610, 630 rotate, contact area 315 and balancing feature 615 exert on the axis of rotation centrifugal forces equal in magnitude but opposite in direction. These forces cancel out to maintain balance. Likewise, balancing features 635A, 635B together exert a centrifugal force cancelling out that of contact area 335. A balancing feature can include one or more areas of additional mass, or one or more areas of reduced mass. Mass can be reduced, e.g., by thinning the conductors. Balancing features can also include extra mass along the length of conductors 610 or 630 except for certain areas. In this way, mass can effectively be reduced to balance, but without reducing the current-carrying capacity of the conductors.

In another example, one or more balancing features 616 can be frangible. A frangible balancing feature can be separated from the conductor 610, 630 of which it is part. This separation can be performed after manufacture of a complete motor, or after bonding step 290 or mating step 295 (FIG. 2). Separation can provide balance adjustments to improve dynamic or static balance. Frangible balancing feature 616 can be connected to a conductor 610, 630 with a perforated pattern or narrow neck that can be fractured, or with metal that is stamped or punched thinner than the rest of the metal sheet 319, 339 (FIG. 3B). In various embodiments, the metal sheet (e.g., sheet 319 or 339) corresponding to frangible balancing feature 616 can be stamped or punched to define break line 617 (e.g., of thinner or perforated metal) along which frangible balancing feature 616 can be separated from the corresponding metal sheet 319, 339. In the example shown here, feature 616 is attached to conductor 610 at a bend thereof, along two perforated break lines 617 (for clarity, only one is shown).

Referring to FIG. 6 and also to FIGS. 3A-3B, in other embodiments forming a rotor using conductors 610, 630, one or more of the conductors 610, 630 is deliberately unbalanced. For example, first pattern 311 and second pattern 312 can define optional unbalanced feature 657. Feature 657 is an area of metal not etched from first metal sheet 319 that is not balanced by a corresponding feature opposite center of rotation 628 from feature 657. As a result, when the rotor spins, it will vibrate. This can be used for non-audio indication, e.g., in a cellular telephone. Feature 657 can be positioned and sized to produce a desired vibration. More than one unbalanced feature can be included. Specifically, first and second patterns 311, 312, or third and fourth patterns 333, 334, can define an unbalanced feature 657 in the metal not removed from the corresponding metal sheet 319, 339 by the corresponding etching step.

The electrophotographic (EP) printing process can be embodied in devices including printers, copiers, scanners, and facsimiles, and analog or digital devices, all of which are referred to herein as "printers." Electrostatographic printers such as electrophotographic printers that employ toner developed on an electrophotographic receiver can be used, as can ionographic printers and copiers that do not rely upon an electrophotographic receiver. Electrophotography and ionography are types of electrostatography (printing using electrostatic fields), which is a subset of electrography (printing using electric fields).

A digital reproduction printing system ("printer") typically includes a digital front-end processor (DFE), a print engine (also referred to in the art as a "marking engine") for applying toner to the receiver, and one or more post-printing finishing system(s) (e.g. a UV coating system, a glosser system, or a laminator system). A printer can reproduce pleasing black-and-white or color onto a receiver. A printer can also produce selected patterns of toner on a receiver, which patterns (e.g. surface textures) do not correspond directly to a visible image. The DFE receives input electronic files (such as Postscript command files) composed of images from other input devices (e.g., a scanner, a digital camera). The DFE can include various function processors, e.g. a raster image processor (RIP), image positioning processor, image manipulation processor, color processor, or image storage processor. The DFE rasterizes input electronic files into image bitmaps for the print engine to print. In some embodiments, the DFE permits a human operator to set up parameters such as layout, font, color, media type, or post-finishing options. The print engine takes the rasterized image bitmap from the DFE and renders the bitmap into a form that can control the printing process from the exposure device to transferring the print image onto the receiver. The finishing system applies features such as protection, glossing, or binding to the prints. The finishing system can be implemented as an integral component of a printer, or as a separate machine through which prints are fed after they are printed.

The printer can also include a color management system which captures the characteristics of the image printing process implemented in the print engine (e.g. the electrophotographic process) to provide known, consistent color reproduction characteristics. The color management system can also provide known color reproduction for different inputs (e.g. digital camera images or film images).

In an embodiment of an electrophotographic modular printing machine, e.g. the NEXPRESS 3000SE printer manufactured by Eastman Kodak Company of Rochester, N.Y., color-toner print images are made in a plurality of color imaging modules arranged in tandem, and the print images are successively electrostatically transferred to a receiver adhered to a transport web moving through the modules. Colored toners include colorants, e.g. dyes or pigments, which absorb specific wavelengths of visible light. Commercial machines of this type typically employ intermediate transfer members in the respective modules for transferring visible images from the photoreceptor and transferring print images to the receiver. In other electrophotographic printers, each visible image is directly transferred to a receiver to form the corresponding print image.

Electrophotographic printers having the capability to also deposit clear toner using an additional imaging module are also known. As used herein, clear toner is considered to be a color of toner, as are C, M, Y, K, and Lk, but the term "colored toner" excludes clear toners. The provision of a clear-toner overcoat to a color print is desirable for providing protection of the print from fingerprints and reducing certain visual artifacts. Clear toner uses particles that are similar to the toner particles of the color development stations but without colored material (e.g. dye or pigment) incorporated into the toner particles. However, a clear-toner overcoat can add cost and reduce color gamut of the print; thus, it is desirable to provide for operator/user selection to determine whether or not a clear-toner overcoat will be applied to the entire print. A uniform layer of clear toner can be provided. A layer that varies inversely according to heights of the toner stacks can also be used to establish level toner stack heights. The respective toners are deposited one upon the other at respective locations on the receiver and the height of a respective toner stack is the sum of the toner heights of each respective color. Uniform stack height provides the print with a more even or uniform gloss.

Figure 1:
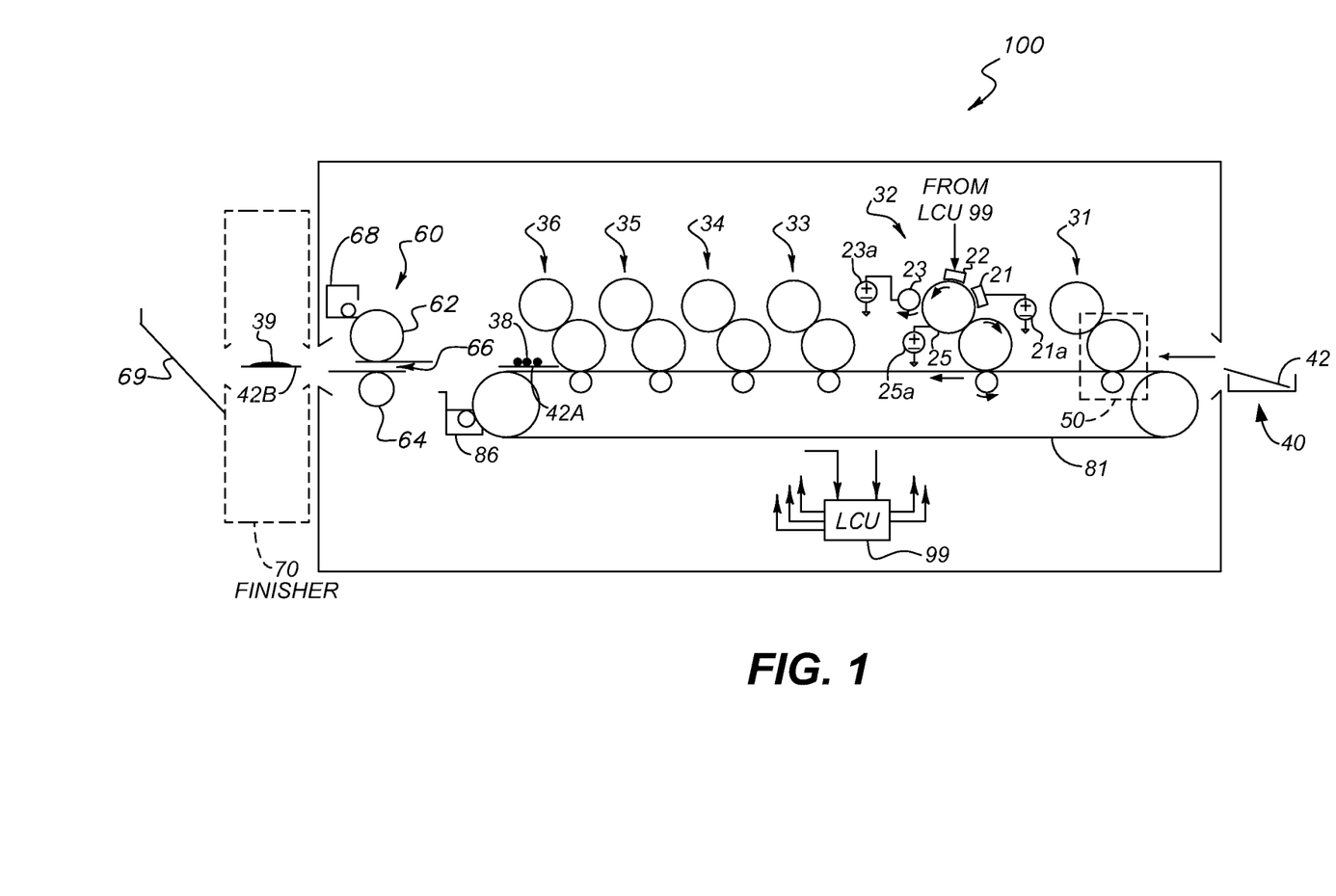
FIG. 1 is an elevational cross-section of an electrophotographic reproduction apparatus.

FIG. 1 is an elevational cross-section showing portions of a typical electrophotographic printer 100. Printer 100 is adapted to produce print images, such as single-color (monochrome), CMYK, or hexachrome (six-color) images, on a receiver (multicolor images are also known as "multi-component" images). Images can include text, graphics, photos, and other types of visual content. An embodiment involves printing using an electrophotographic print engine having six sets of single-color image-producing or -printing stations or modules arranged in tandem, but more or fewer than six colors can be combined to form a print image on a given receiver. Other electrophotographic writers or printer apparatus can also be included. Various components of printer 100 are shown as rollers; other configurations are also possible, including belts.

Referring to FIG. 1, printer 100 is an electrophotographic printing apparatus having a number of tandemly-arranged electrophotographic image-forming printing modules 31, 32, 33, 34, 35, 36, also known as electrophotographic imaging subsystems. Each printing module 31, 32, 33, 34, 35, 36 produces a single-color toner image for transfer using a respective transfer subsystem 50 (for clarity, only one is labeled) to a receiver 42 successively moved through the modules. Receiver 42 is transported from supply unit 40, which can include active feeding subsystems as known in the art, into printer 100. In various embodiments, the visible image can be transferred directly from an imaging roller to a receiver 42, or from an imaging roller to one or more transfer roller(s) or belt(s) in sequence in transfer subsystem 50, and then to receiver 42. Receiver 42 is, for example, a selected section of a web of, or a cut sheet of, planar media such as paper or transparency film.

Each printing module 31, 32, 33, 34, 35, 36 includes various components. For clarity, these are only shown in printing module 32. Around photoreceptor 25 are arranged, ordered by the direction of rotation of photoreceptor 25, charger 21, exposure subsystem 22, and toning station 23.

In the EP process, an electrostatic latent image is formed on photoreceptor 25 by uniformly charging photoreceptor 25 and then discharging selected areas of the uniform charge to yield an electrostatic charge pattern corresponding to the desired image (a "latent image"). Charger 21 produces a uniform electrostatic charge on photoreceptor 25 or its surface. Exposure subsystem 22 selectively image-wise discharges photoreceptor 25 to produce a latent image. Exposure subsystem 22 can include a laser and raster optical scanner (ROS), one or more LEDs, or a linear LED array.

After the latent image is formed, charged toner particles are brought into the vicinity of photoreceptor 25 by toning station 23 and are attracted to the latent image to develop the latent image into a visible image. Note that the visible image may not be visible to the naked eye depending on the composition of the toner particles (e.g. clear toner). Toning station 23 can also be referred to as a development station. Toner can be applied to either the charged or discharged parts of the latent image.

After the latent image is developed into a visible image on photoreceptor 25, a suitable receiver 42 is brought into juxtaposition with the visible image. In transfer subsystem 50, a suitable electric field is applied to transfer the toner particles of the visible image to receiver 42 to form the desired print image 38 on the receiver, as shown on receiver 42A. The imaging process is typically repeated many times with reusable photoreceptors 25.

Receiver 42A is then removed from its operative association with photoreceptor 25 and subjected to heat or pressure to permanently fix ("fuse") print image 38 to receiver 42A. Plural print images, e.g. of separations of different colors, are overlaid on one receiver before fusing to form a multi-color print image 38 on receiver 42A.

Each receiver 42, during a single pass through the six printing modules 31, 32, 33, 34, 35, 36, can have transferred in registration thereto up to six single-color toner images to form a pentachrome image. As used herein, the term "hexachrome" implies that in a print image, combinations of various of the six colors are combined to form other colors on receiver 42 at various locations on receiver 42. That is, each of the six colors of toner can be combined with toner of one or more of the other colors at a particular location on receiver 42 to form a color different than the colors of the toners combined at that location. In an embodiment, printing module 31 forms black (K) print images, 32 forms yellow (Y) print images, 33 forms magenta (M) print images, 34 forms cyan (C) print images, 35 forms light-black (Lk) images, and 36 forms clear images.

In various embodiments, printing module 36 forms print image 38 using a clear toner or tinted toner. Tinted toners absorb less light than they transmit, but do contain pigments or dyes that move the hue of light passing through them towards the hue of the tint. For example, a blue-tinted toner coated on white paper will cause the white paper to appear light blue when viewed under white light, and will cause yellows printed under the blue-tinted toner to appear slightly greenish under white light.

Receiver 42A is shown after passing through printing module 36. Print image 38 on receiver 42A includes unfused toner particles.

Subsequent to transfer of the respective print images 38, overlaid in registration, one from each of the respective printing modules 31, 32, 33, 34, 35, 36, receiver 42A is advanced to a fuser 60, i.e. a fusing or fixing assembly, to fuse print image 38 to receiver 42A. Transport web 81 transports the print-image-carrying receivers (e.g., 42A) to fuser 60, which fixes the toner particles to the respective receivers 42A by the application of heat and pressure. The receivers 42A are serially de-tacked from transport web 81 to permit them to feed cleanly into fuser 60. Transport web 81 is then reconditioned for reuse at cleaning station 86 by cleaning and neutralizing the charges on the opposed surfaces of the transport web 81. A mechanical cleaning station (not shown) for scraping or vacuuming toner off transport web 81 can also be used independently or with cleaning station 86. The mechanical cleaning station can be disposed along transport web 81 before or after cleaning station 86 in the direction of rotation of transport web 81.

Fuser 60 includes a heated fusing roller 62 and an opposing pressure roller 64 that form a fusing nip 66 therebetween. In an embodiment, fuser 60 also includes a release fluid application substation 68 that applies release fluid, e.g. silicone oil, to fusing roller 62. Alternatively, wax-containing toner can be used without applying release fluid to fusing roller 62. Other embodiments of fusers, both contact and non-contact, can be employed. For example, solvent fixing uses solvents to soften the toner particles so they bond with the receiver 42. Photoflash fusing uses short bursts of high-frequency electromagnetic radiation (e.g. ultraviolet light) to melt the toner. Radiant fixing uses lower-frequency electromagnetic radiation (e.g. infrared light) to more slowly melt the toner. Microwave fixing uses electromagnetic radiation in the microwave range to heat the receivers (primarily), thereby causing the toner particles to melt by heat conduction, so that the toner is fixed to the receiver 42.

The receivers (e.g., receiver 42B) carrying the fused image (e.g., fused image 39) are transported in a series from the fuser 60 along a path either to a remote output tray 69, or back to printing modules 31, 32, 33, 34, 35, 36 to create an image on the backside of the receiver (e.g., receiver 42B), i.e. to form a duplex print. Receivers (e.g., receiver 42B) can also be transported to any suitable output accessory. For example, an auxiliary fuser or glossing assembly can provide a clear-toner overcoat. Printer 100 can also include multiple fusers 60 to support applications such as overprinting, as known in the art.

In various embodiments, between fuser 60 and output tray 69, receiver 42B passes through finisher 70. Finisher 70 performs various media-handling operations, such as folding, stapling, saddle-stitching, collating, and binding.

Printer 100 includes main printer apparatus logic and control unit (LCU) 99, which receives input signals from the various sensors associated with printer 100 and sends control signals to the components of printer 100. LCU 99 can include a microprocessor incorporating suitable look-up tables and control software executable by the LCU 99. It can also include a field-programmable gate array (FPGA), programmable logic device (PLD), microcontroller, or other digital control system. LCU 99 can include memory for storing control software and data. Sensors associated with the fusing assembly provide appropriate signals to the LCU 99. In response to the sensors, the LCU 99 issues command and control signals that adjust the heat or pressure within fusing nip 66 and other operating parameters of fuser 60 for receivers. This permits printer 100 to print on receivers of various thicknesses and surface finishes, such as glossy or matte.

Image data for writing by printer 100 can be processed by a raster image processor (RIP; not shown), which can include a color separation screen generator or generators. The output of the RIP can be stored in frame or line buffers for transmission of the color separation print data to each of respective LED writers, e.g. for black (K), yellow (Y), magenta (M), cyan (C), and red (R), respectively. The RIP or color separation screen generator can be a part of printer 100 or remote therefrom. Image data processed by the RIP can be obtained from a color document scanner or a digital camera or produced by a computer or from a memory or network which typically includes image data representing a continuous image that needs to be reprocessed into halftone image data in order to be adequately represented by the printer. The RIP can perform image processing processes, e.g. color correction, in order to obtain the desired color print. Color image data is separated into the respective colors and converted by the RIP to halftone dot image data in the respective color using matrices, which comprise desired screen angles (measured counterclockwise from rightward, the +X direction) and screen rulings. The RIP can be a suitably-programmed computer or logic device and is adapted to employ stored or computed matrices and templates for processing separated color image data into rendered image data in the form of halftone information suitable for printing. These matrices can include a screen pattern memory (SPM).

Various parameters of the components of a printing module (e.g., printing module 31) can be selected to control the operation of printer 100. In an embodiment, charger 21 is a corona charger including a grid between the corona wires (not shown) and photoreceptor 25. Voltage source 21a applies a voltage to the grid to control charging of photoreceptor 25. In an embodiment, a voltage bias is applied to toning station 23 by voltage source 23a to control the electric field, and thus the rate of toner transfer, from toning station 23 to photoreceptor 25. In an embodiment, a voltage is applied to a conductive base layer of photoreceptor 25 by voltage source 25a before development, that is, before toner is applied to photoreceptor 25 by toning station 23. The applied voltage can be zero; the base layer can be grounded. This also provides control over the rate of toner deposition during development. In an embodiment, the exposure applied by exposure subsystem 22 to photoreceptor 25 is controlled by LCU 99 to produce a latent image corresponding to the desired print image. All of these parameters can be changed, as described below.

Further details regarding printer 100 are provided in U.S. Pat. No. 6,608,641 and in U.S. Publication No. 2006/0133870, the disclosures of which are incorporated herein by reference.

The invention has been described in detail with particular reference to certain preferred embodiments thereof, but it will be understood that variations and modifications can be effected within the scope of the invention.

PARTS LIST 21 charger
21a voltage source
22 exposure subsystem
23 toning station
23a voltage source
25 photoreceptor
25a voltage source
31 printing module
32 printing module
33 printing module
34 printing module
35 printing module
36 printing module
38 print image
39 fused image
40 supply unit
42 receiver
42A receiver
42B receiver
50 transfer subsystem
60 fuser
62 fusing roller
64 pressure roller
66 fusing nip
68 release fluid application substation
69 output tray
70 finisher
81 transport web
86 cleaning station
99 logic and control unit (LCU)
100 printer
210 provide first metal sheet step
215 apply first plastic pattern step
217 deposit electrophotographically step
218 fix deposited particles step
220 apply second plastic pattern step
225 etch first sheet step
250 provide second metal sheet step
255 apply third plastic pattern step
260 apply fourth plastic pattern step
265 etch second sheet step
280 select first contact region step
285 select second contact region step
290 bond patterns step
292 heat and press sheets step
294 apply adhesive step
295 mate sheets step
297 solder or weld step
311 pattern
312 pattern
315 contact region
319 metal sheet
333 pattern
334 pattern
335 contact region
339 metal sheet
355 conductive adhesive
360 electrode
370 electrode
380 electrode
390 bonding area
410 upper housing
411 hole
412 lower housing
413 bracket
414 bracket
415 opening
416 fixing member
418 opening
420 printed-circuit board (PCB)
421 base
423 plate
429 underside
430 stator
440 rotor
442 magnet
442A magnet
442B magnet
442C magnet
442D magnet
442E magnet
442F magnet
442G magnet
442H magnet
452 bearing
454 bearing
460 rotating shaft
470 control unit 481 hole
510 shaft
515 rotor
518 bearing
521 magnet
550 stator
609 AC supply
610 conductor
615 balancing feature
616 frangible balancing feature
617 break line
619 tangential arc
628 center of rotation
630 conductor
635A balancing feature
635B balancing feature
639 tangential arc
657 unbalanced feature
I current
F force

The invention claimed is:

1. A method of making a shaped electrical conductor comprising:
providing a first sheet of metal having a first thickness;
applying a first thermoplastic adhesive pattern to a first surface of the first sheet;
applying a second thermoplastic adhesive pattern to a second surface of the first sheet, the second pattern being fully justified with the applied first pattern;
etching the first sheet to remove metal not covered by the thermoplastic adhesive patterns so that no metal bridges remain between disconnected coated portions of the first sheet;
providing a second sheet of metal having a second thickness;
applying a third thermoplastic adhesive pattern to a first surface of the second sheet;
applying a fourth thermoplastic adhesive pattern to a second surface of the second sheet, the fourth pattern being fully justified with the applied third pattern;
etching the second sheet to remove metal not covered by the thermoplastic adhesive patterns so that no metal bridges remain between disconnected coated portions of the second sheet;
selecting a first contact region in the second adhesive pattern;
selecting a second contact region in the third adhesive pattern;
bonding the second and third adhesive patterns to each other at more than one point; and
mating the first and second sheets so that the first contact region is in electrical contact with the second contact region.

2. The method of claim 1 wherein the first and second patterns are different from the third and fourth patterns.

3. The method of claim 1 wherein the first and second patterns are circular and the third and fourth patterns are elliptical spirals.

4. The method of claim 3 wherein a long axis of the elliptical spirals is twice a length of an axis of the first and second circular patterns.

5. The method of claim 1, wherein the first and second metal sheets are at least 0.1 mm thick.

6. The method of claim 1, wherein one of the thermoplastic adhesive patterns includes a plurality of traces having widths less than 2 mm.

7. The method of claim 1, wherein the bonding step includes heating the two sheets and pressing them together.

8. The method of claim 1, wherein each applying step includes using an electrophotographic print engine to deposit thermoplastic particles in a corresponding deposition pattern, and fixing the deposited particles to the corresponding sheet under heat or pressure.

9. The method of claim 1, wherein the mating step includes soldering or welding the first contact region and the second contact region together.

10. The method of claim 1, wherein the mating step includes applying a conductive adhesive to the first or second contact region and bringing the two contact regions into mechanical contact with the applied adhesive.

11. The method of claim 1 wherein the first thickness and the second thickness are different.

12. The method of claim 1 wherein further including:
providing a third sheet of metal having a third thickness;
applying a fifth thermoplastic adhesive pattern to a first surface of the third sheet;
applying a sixth thermoplastic adhesive pattern to a second surface of the third sheet, the sixth pattern being fully justified with the applied fifth pattern;
etching the third sheet to remove metal not covered by the thermoplastic adhesive patterns so that no metal bridges remain between disconnected coated portions of the third sheet;
selecting a third contact region in the fourth adhesive pattern;
selecting a fourth contact region in the fifth adhesive pattern;
bonding the fourth and fifth adhesive patterns to each other at more than one point; and
mating the second and third sheets so that the third contact region is in electrical contact with the fourth contact region.

13. The method of claim 12 wherein the fifth thermoplastic pattern is a rotation of the first thermoplastic pattern.

14. The method of claim 1 wherein the shaped electrical conductor forms a winding pattern for an electric motor.

15. The method of claim 1, wherein the first and second patterns, or the third and fourth patterns, define balancing features in the metal not removed from the corresponding metal sheet by the corresponding etching step.

16. The method of claim 15, wherein at least one of the balancing features is frangible, so that the frangible balancing feature can be separated from the corresponding metal sheet to provide balance adjustments to improve dynamic or static balance.

17. The method of claim 16, further including punching or stamping the metal sheet corresponding to the frangible balancing feature to define a break line along which the frangible balancing feature can be separated from the corresponding metal sheet.

18. The method according to claim 1, wherein the first and second patterns, or the third and fourth patterns, define an unbalanced feature in the metal not removed from the corresponding metal sheet by the corresponding etching step.

* * * * *